United States Patent
Baker et al.

(10) Patent No.: US 6,934,378 B2
(45) Date of Patent: Aug. 23, 2005

(54) TECHNIQUE FOR ENHANCED INFORMATION ASSISTANCE CALL ROUTING

(75) Inventors: Nathan Bryant Baker, Tigard, OR (US); Christopher Alan Huey, Banks, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 392 days.

(21) Appl. No.: 10/160,307

(22) Filed: May 31, 2002

(65) Prior Publication Data

US 2003/0223564 A1 Dec. 4, 2003

(51) Int. Cl.$^7$ ................................................ H04M 3/42
(52) U.S. Cl. ............................ 379/218.01; 379/211.02
(58) Field of Search ........................ 379/112.09, 114.24, 379/211.02, 218.01, 221.15

(56) References Cited

U.S. PATENT DOCUMENTS

| | | | |
|---|---|---|---|
| 4,608,460 A | * | 8/1986 | Carter et al. .................. 379/71 |
| 5,239,577 A | * | 8/1993 | Bates et al. ............ 379/211.02 |
| 5,850,433 A | * | 12/1998 | Rondeau ................. 379/218.01 |
| 5,926,744 A | * | 7/1999 | Fukuzawa et al. ............. 725/69 |
| 6,289,090 B1 | * | 9/2001 | Tessler et al. .......... 379/207.02 |
| 6,381,325 B1 | * | 4/2002 | Hanson .................. 379/218.01 |
| 6,404,877 B1 | * | 6/2002 | Bolduc et al. .......... 379/218.01 |
| 6,473,612 B1 | * | 10/2002 | Cox et al. ................. 455/414.2 |
| 6,570,974 B1 | * | 5/2003 | Gerszberg et al. ..... 379/218.01 |
| 6,580,790 B1 | * | 6/2003 | Henry et al. ............ 379/201.01 |
| 6,628,772 B1 | * | 9/2003 | McGrath et al. ........ 379/218.01 |
| 6,721,401 B2 | * | 4/2004 | Lee et al. ................. 379/93.17 |

* cited by examiner

*Primary Examiner*—Bing Q. Bui
(74) *Attorney, Agent, or Firm*—Kaye Scholer LLP

(57) ABSTRACT

In an information assistance service environment, after information assistance is provided to a caller, the caller may request to have the information assistance service provider complete the call. In the prior art, the call was routed back to the carrier switch from which the information assistance service provider received the call, and that carrier completed the call. In the invention, the information assistance service provider chooses how to route the call to the destination requested by the caller. A routing database including routes available to terminate the call is searched and the call is routed after considering a number of criteria such as availability of routing trunks, the LATA (local access and transport area) within which the destination phone number resides, pricing information, or a combination of these criteria. Routing may be accomplished using a local exchange carrier (LEC), an inter-exchange (or long-distance) carrier (IXC), an inter-machine transfer trunk (IMT), which connects two or more information assistance service centers, or a combination of these.

47 Claims, 3 Drawing Sheets

TECHNIQUE FOR ENHANCED INFORMATION ASSISTANCE CALL ROUTING

BACKGROUND OF THE INVENTION

The invention relates generally to a communications system and method. More specifically, the invention relates to a system and method for routing calls through an information assistance service.

In a typical information assistance call, a caller identifies to the operator the name and address (sometimes city or area code) of a party whose telephone number is desired. In response, the operator locates the desired destination number using, e.g., a computer database. The destination number is then provided to the caller, e.g., by a computerized voice server which provides automated voicing of the number, and the caller is afforded an option to be connected to the destination number without the need of first terminating the information assistance call.

FIG. 1 illustrates prior art system 100 where a caller initiates an information assistance call, which is routed via carrier switch 110 in a carrier network, e.g., a public switched telephone network (PSTN), a wireless telephone network, etc. The call is forwarded from carrier switch 110 over leg 1 to information assistance service center 120, where the caller is provided with requested information including, e.g., a desired destination number. If the caller elects to have the information assistance center complete the call to destination terminal 140 associated with the destination number, the call is routed over leg 2 back to carrier switch 110, which then routes the call over leg 3, network 130 and leg 4 to destination terminal 140.

SUMMARY OF THE INVENTION

The prior art information assistance call routing arrangement described above is inefficient because the call received by the information assistance service center from the carrier switch must be routed back through the same switch before being routed through a network connected to the destination terminal. The invention overcomes the prior art limitations by having the information assistance service center route such a call to the destination terminal through the network, in reference to routing requirements, bypassing the carrier switch from which the call was forwarded to the information assistance service center.

The present invention provides a system and method for routing an information assistance call. The method includes receiving the call via a carrier switch from a caller desiring an information assistance service, providing the desired information assistance service, searching a routing database to determine which of a plurality of connections is available to terminate the call, determining based on one or more criteria how to route the call to a destination terminal associated with the service desired by the caller, and then connecting the call to the destination terminal without routing the call back through the carrier switch. In accordance with an aspect of the invention, the method includes searching a second database for a telephone number associated with the destination terminal. This second database may be accessed via an interface which may be connected to the Internet and may include, e.g., restaurant and/or movie listings. In another embodiment, the information assistance service is an operator-assisted service, which may include, for example, collect calling, station-to-station calling, person-to-person calling, or third-party-billed calling services. In accordance with another aspect of the invention, the information assistance service includes a telecommunications relay station, such as may be used by hearing-impaired customers. The plurality of connections available to terminate the call may include using an end office (EO), a tandem (or equal access tandem), a local exchange carrier (LEC), an inter-exchange (or long-distance) carrier (IXC), an inter-machine transfer trunk (IMT), or a combination of these connections. Such an IMT may connect two information assistance service centers. The criteria used to route the call to the destination terminal may include the availability of routing trunks, the LATA (local access and transport area) within which the destination terminal resides, pricing information, or a combination of these criteria. There may also be a preferred routing hierarchy, such as preferring an end office routing over a tandem routing over an IMT routing over an IXC routing.

The system for routing an information assistance call in accordance with the invention includes a servicing switch for receiving via a carrier switch a call from a caller desiring an information assistance service, an interface for providing the desired information assistance service and for connecting the call to a destination terminal associated with the service desired by the caller, and a control unit for determining which of a plurality of connections is available to terminate the call and for determining, based on one or more criteria, how to route the call to the destination terminal. The servicing switch connects the call to the destination terminal without routing the call back through the carrier switch. The interface may include an operator. The term "operator" used herein broadly encompasses entities that are capable of providing information assistance in a telecommunications environment, including, without limitation, human operators, voice response/recognition capabilities, web-/WAP-enabled operator services, and other automated and electronic access. The control unit may also consult a routing database to determine an available connection. The available connections may use an EO, a tandem, a LEC, an IXC, an MT, or a combination of these. Such an IMT may be connected to an information assistance service center. The routing criteria may include availability of routing trunks, the LATA of the destination terminal, pricing information, or a combination of these criteria. A preferred routing hierarchy may also be available.

Another system in accordance with the present invention includes first and second information assistance service centers and an IMT connecting the two centers. The first center receives the call from a caller via a switch, provides an information assistance service to the caller, and, without routing the call back through the switch, connects the call over the IMT to a destination terminal associated with the service provided to the caller.

The present invention allows an information assistance service center to route a received call to a destination terminal instead of inefficiently routing it back through the same carrier switch from which the call came, as in the prior art. Such an arrangement eliminates the delay otherwise caused by the carrier switch in routing the call to the destination and may reduce the cost of completing the call to the destination. The invention allows a communications network to operate with less switching equipment while maintaining efficient, least-cost routing scenarios. The invention also allows an operator services node or a telecommunications relay station to operate as a switch within the routing network to route the call to the destination terminal, without returning the call to the carrier switch from which the call is forwarded to the node or relay station.

Additional advantages of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

Figure 1:
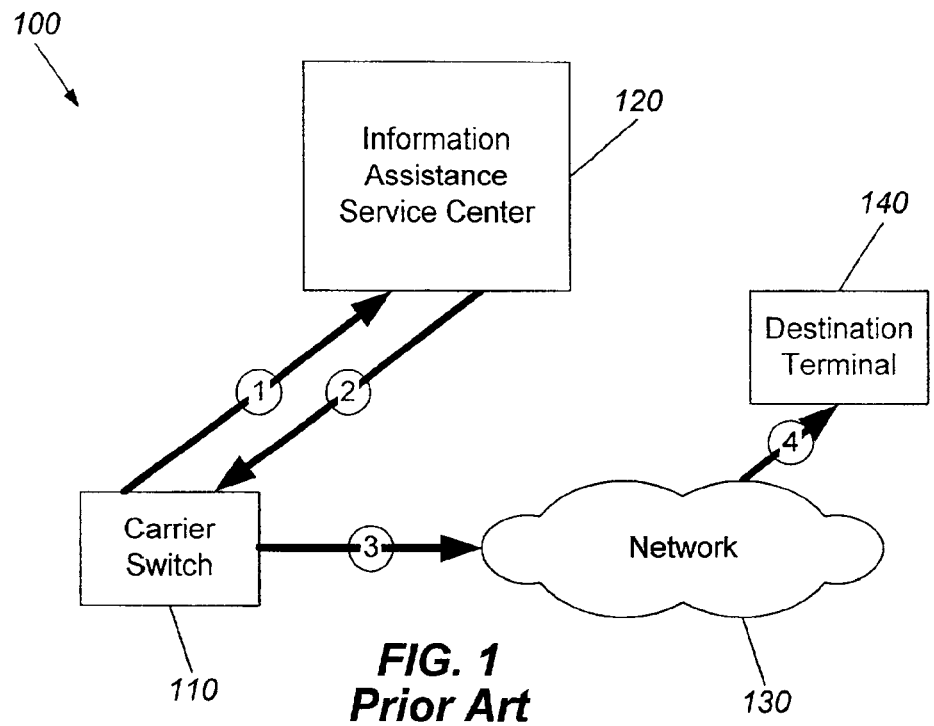
FIG. 1 illustrates a prior art information assistance service system for connecting an information assistance service call to a destination terminal.

The present invention is directed to providing an information assistance service to such users as wireline (landline) telephone, wireless telephone, and other communications device users. FIG. 2 illustrates system 200 embodying the principles of the invention. Similar to system 100 in FIG. 1, system 200 includes carrier switch 110, network 130, and destination terminal 140. However, unlike information assistance service center 120 in system 100, information assistance service center 220 (including information assistance service provider 222 and servicing platform 228) routes an information assistance call to destination terminal 140, without routing it back through carrier switch 110 from which the call was forwarded to service center 220. In this illustrative embodiment, users of a particular telephone carrier may dial, speak or otherwise communicate predetermined access digits, access codes or retail numbers, or input a predetermined address or URL (uniform resource locator) established by the carrier to access information assistance service center 220. For example, the predetermined access digits may be "411," "*555," "555-1212," "00," etc. On learning one such access digit sequence initiated from a user's communications device, carrier switch 110 in a conventional manner routes the information assistance call to service center 220. Carrier switch 110 may be an end office switch, an equal access tandem switch, or a local exchange carrier (LEC) switch if the information assistance call is a local call, or may be a long distance carrier (inter-exchange carrier or IXC) switch if the information assistance call is a long distance call.

Figure 2:
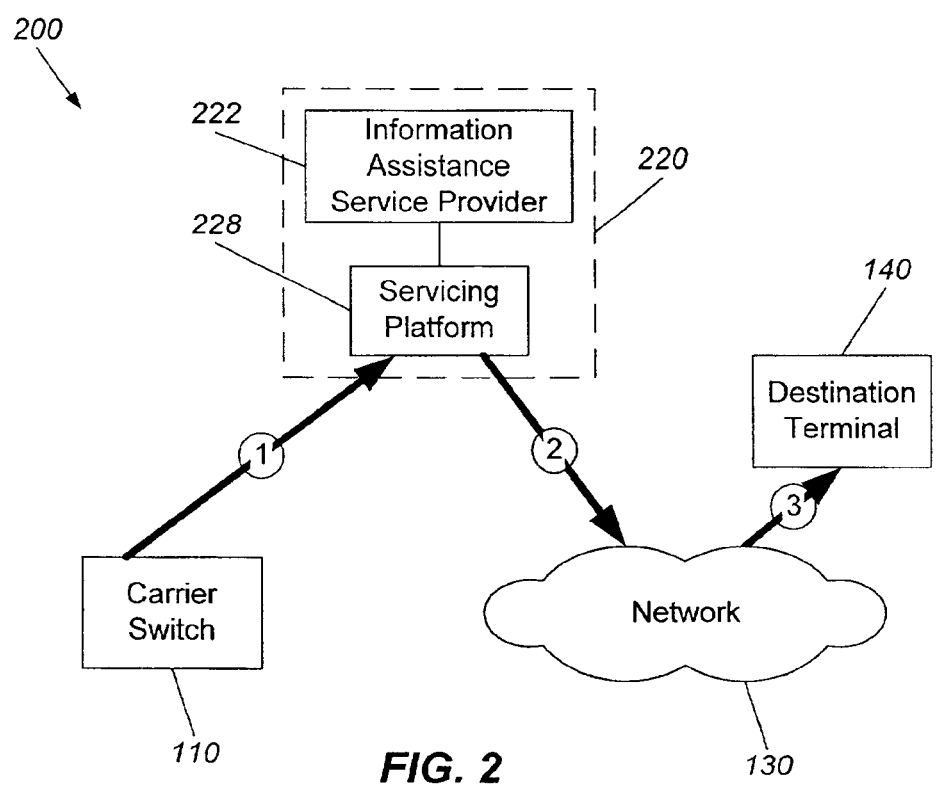
FIG. 2 illustrates a system for connecting an information assistance service call to a destination terminal in accordance with an embodiment of the present invention.

In contrast to prior art system 100 illustrated in FIG. 1, the information assistance service center in accordance with the present invention is capable of routing calls itself, and not just handing the calls back to carrier switch 110. Thus, if the caller elects to have the information assistance service center complete the call, the call is routed over leg 2 to network 130 for routing to destination terminal 140. Network 130 represents a combination of public and private networks, switches, trunks, and central and end offices. An example of a public network is the public switched telephone network (PSTN).

Figure 3:
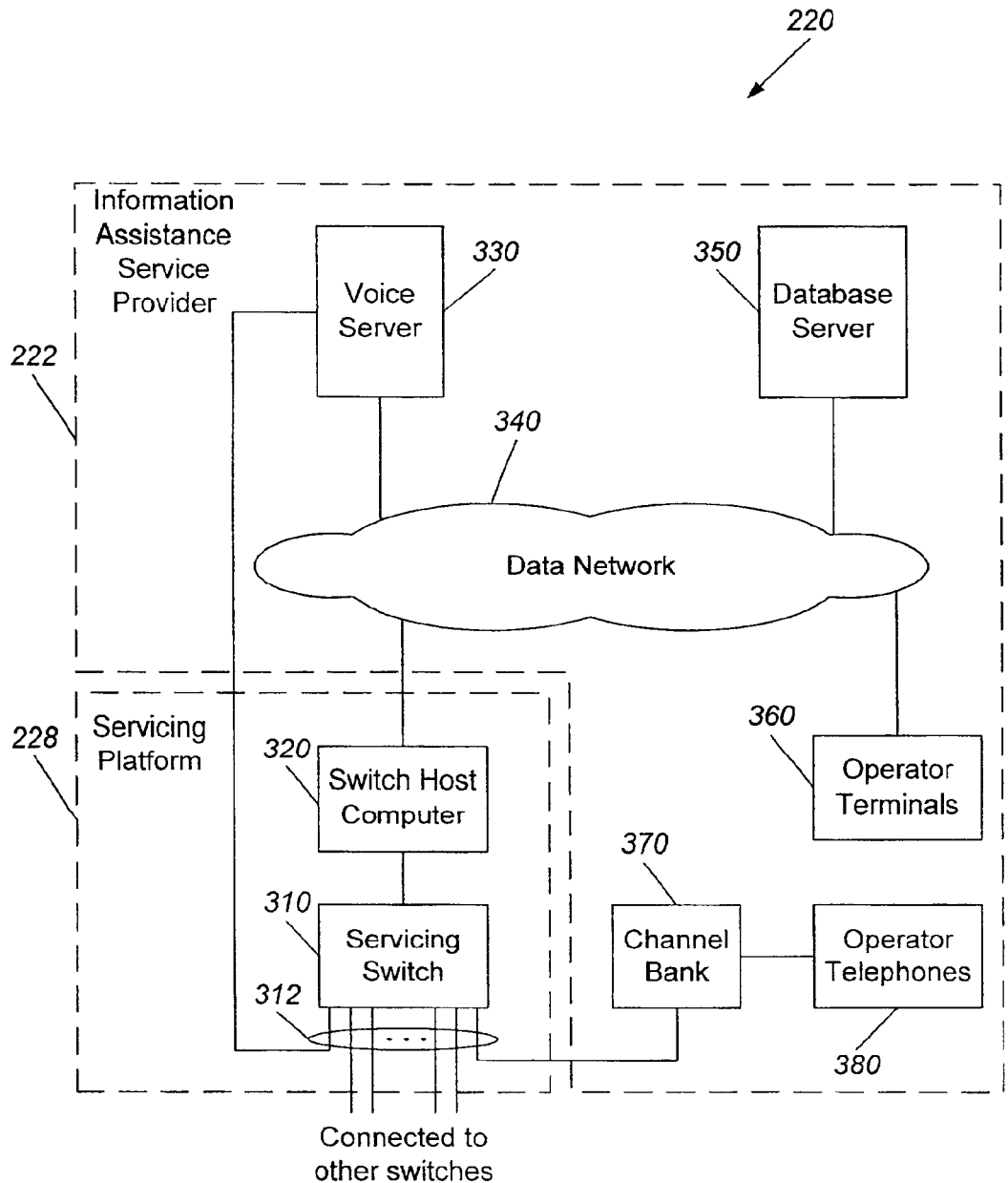
FIG. 3 illustrates an information assistance service provider and a servicing platform for providing an information assistance service.

FIG. 3 illustrates information assistance service center 220, which, as mentioned above, includes information assistance service provider 222 together with servicing platform 228. It should be noted that even though both provider 222 and servicing platform 228 appear in the same figure, they may or may not be located in the same geographic area. In FIG. 3, servicing platform 228 comprises servicing switch 310 having T1 spans 312 for connection to voice server 330, channel bank 370, and other switches including, e.g., carrier switches. Servicing switch 310 may receive an incoming information assistance call from a carrier switch, e.g., carrier switch 110. Servicing switch 310 may also be used to place an outgoing call through a switch that is part of a network, e.g., network 130, where the switch may be different from the carrier switch used for the incoming call. In an alternative embodiment, the incoming and outgoing calls may traverse a packet-switched network in which voice information is packetized and communicated pursuant to a VoIP (voice over IP (Internet Protocol)) protocol.

Channel bank 370 in provider 222 is used to couple multiple operator telephones 380 to servicing switch 310. The operators in service center 220 are further equipped with operator terminals 360, each of which includes a video display unit and a keyboard with an associated dialing pad. Operator terminals 360 are connected over data network 340 to one or more database servers 350 (although only one is shown in the figure). Switch host computer 320 and voice server 330 are also connected to data network 340. By way of example, data network 340 includes a local area network (LAN) supplemented by a number of point-to-point data links. Through data network 340 and routers (not shown), components of service center 220 may also be connected to the Internet or other wide area networks (WANs).

Servicing switch 310 is conventional and supports digital T1 connectivity. The operation of servicing switch 310 is governed by instructions stored in switch host computer 320. In this illustrative embodiment, servicing switch 310 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on service center 220 and servicing switch 310 for each corresponding function.

An incoming call requesting information assistance is received by servicing switch 310 in service center 220 which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 320 or elsewhere in service center 220. In other instances, other distribution logic schemes may be utilized, such as skills-based routing or a priority scheme for preferred users.

Operators may use database server 350 to provide information assistance including searching for a user's desired party and determining the appropriate destination number of the party. Other information assistance concerning restaurant recommendations, movie listings, events, etc. may also be provided by searching database server 350. Such database information may also be retrieved using the Internet.

Voice server 330 is used to play the constant repeated parts of an operator's speech, namely, the various greetings and signoffs (or closings). Voice server 330 is connected via data network 340 to switch host computer 320 and via one or more T1 spans to servicing switch 310. Voice server 330 may comprise a general purpose computer and one or more voice cards for voice recognition, voice recording and playback, and call progress analysis. At appropriate stages in a call progression, switch host computer 320 initiates a voice path connection between voice server 330 and servicing switch 310 such that the user, or the user and the operator, are able to hear whatever pre-recorded speech is played on that connection by voice server 330. Computer 320 then instructs voice server 330, via data network 340, what type of message to play, and passes data parameters that enable voice server 330 to locate the message appropriate to the call state.

Referring also to FIG. 2, the aforementioned information assistance call in this instance is switched by carrier switch 110 to servicing switch 310 via an inbound channel of one of T1 spans 312. The inbound channel or leg 1 carrying the information assistance call engages an incoming port (not shown) of servicing switch 310.

By way of example, the caller in the instant information assistance call identifies to an operator the name and address (sometimes city or area code) of a party whose telephone number is desired. In response, the operator locates the desired destination number using, e.g., database server 350. The caller then chooses to be connected to the destination number without the need to first terminate the call. Based on the destination number, information assistance service center 220 determines the call routing in accordance with the invention, using a routing table or database, for example, depending on the carrier switches and networks to which it is connected.

By routing the call through information assistance service center 220, a call may be connected more efficiently, and possibly more economically, than in the prior art. As such, information assistance service center 220 becomes more than just a service node to a carrier network as in the prior art. In particular, servicing platform 228 actually becomes integral to the routing of calls and performs Class 5 switch functions similar to those of carrier switch 110 and switches in network 130.

Figure 4:
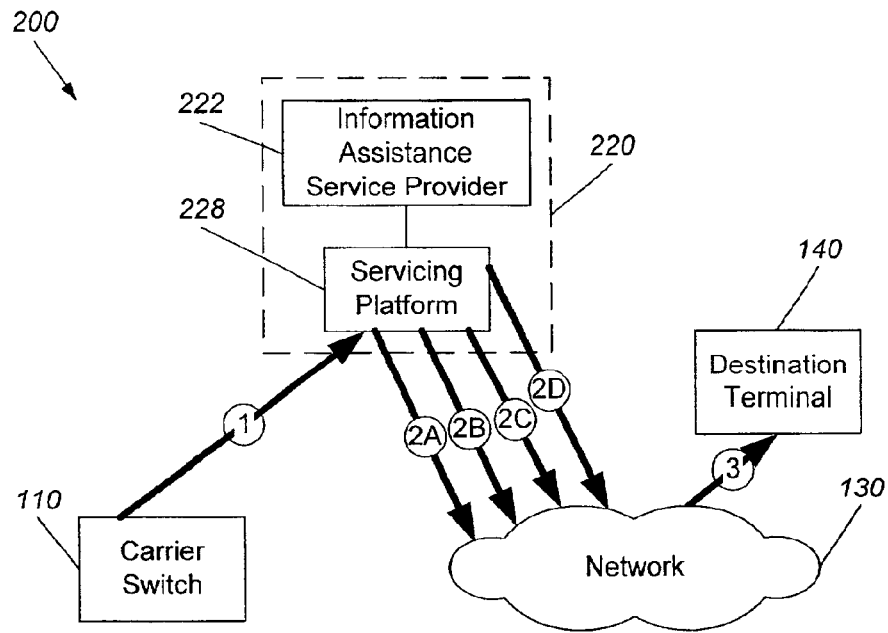
FIG. 4 illustrates a system having different ways of routing an information assistance service call in accordance with a second embodiment of the present invention.

FIG. 4 illustrates an information assistance service system similar to that of FIG. 2, but includes several different options (legs 2A, 2B, 2C, 2D) for routing a call via network 130. As in the system illustrated in FIG. 2, a caller is connected over leg 1 to information assistance service center 220 via carrier switch 110. Instead of routing the call back to carrier switch 110 as in the prior art, servicing platform 228 acts as a Class 5 switch itself, and directs the call to destination terminal 140. Regardless of whether the destination terminal is within the same or different LATA (local access and transport area) in which information assistance service center 220 lies, the routing may be via a LEC end office (EO) trunk, an equal access tandem trunk, long distance (IXC) trunks, private lines (e.g., an inter-machine transfer (IMT) trunk), or a combination of these. The actual routing selected may depend on the markets being served and the number of phones served by each particular trunk.

Thus, once a caller decides to have information assistance service center 220 complete the call, information assistance service center 220 can select the appropriate outbound routing based upon, for example, the destination telephone number, the availability of routing trunks, the LATA within which the destination terminal resides, and pricing information.

In order to facilitate such dynamic routing, switch host computer 320 consults a table or tables (or databases) therein which include information about which trunks and/or switches are connected to the destination terminal. Computer 320 determines several available routes over which the telephone call may be routed, and then decides on the specific route to take based on cost, availability of the trunks or switches on the route, and speed of connection. In addition, based on ever-changing routing situations, a route selected at one time on one day may not be the same route selected at another time, even if the destination telephone number is the same.

In an example of the dynamic call routing, computer 320 determines the destination telephone number (which includes the area code (NPA), exchange (NXX), and line number). Computer 320 then consults a table, for instance a local exchange routing guide (LERG) table, to determine the local switches and trunks connected to the destination terminal. A LERG table may contain a list of current NPA-NXX within each LATA, and may also include the CLLI (common language location identification) code for the line-range switch serving that NPA-NXX. The CLLI code usually represents an end office (EO), but a tandem function switch could also serve the NPA-NXX. Such a tandem serving an EO may be identified by examining the LERG switch homing arrangements. Once a valid tandem is found, such as a Terminating Feature Group D tandem, computer 320 may look up a second table to find a T1 line emanating from servicing switch 310 to that tandem. Once the T1 line is found, and it is determined that a trunk within the T1 line is available, the call may be terminated (i.e., routed to destination terminal 140). If such a trunk is not available, computer 320 may select an IXC trunk which serves the terminating LATA in order to terminate the call.

The process of deciding which IXC trunk to select is similar. Computer 320 consults another table, for example an IXC Route Table, to determine the IXC switches and trunks serving the destination terminal's LATA. Once a valid IXC is found, the system may look up still another table to find a T1 line connected between the information assistance service center 220 and that IXC trunk. Once the T1 line is found, and it is determined that a trunk within the T1 line is available, the call may be terminated (i.e., routed to destination terminal 140). If such a trunk is not available, and no other IXC trunk is available, then the caller is informed by an appropriate voice announcement that the information assistance call cannot be completed.

Figure 5:
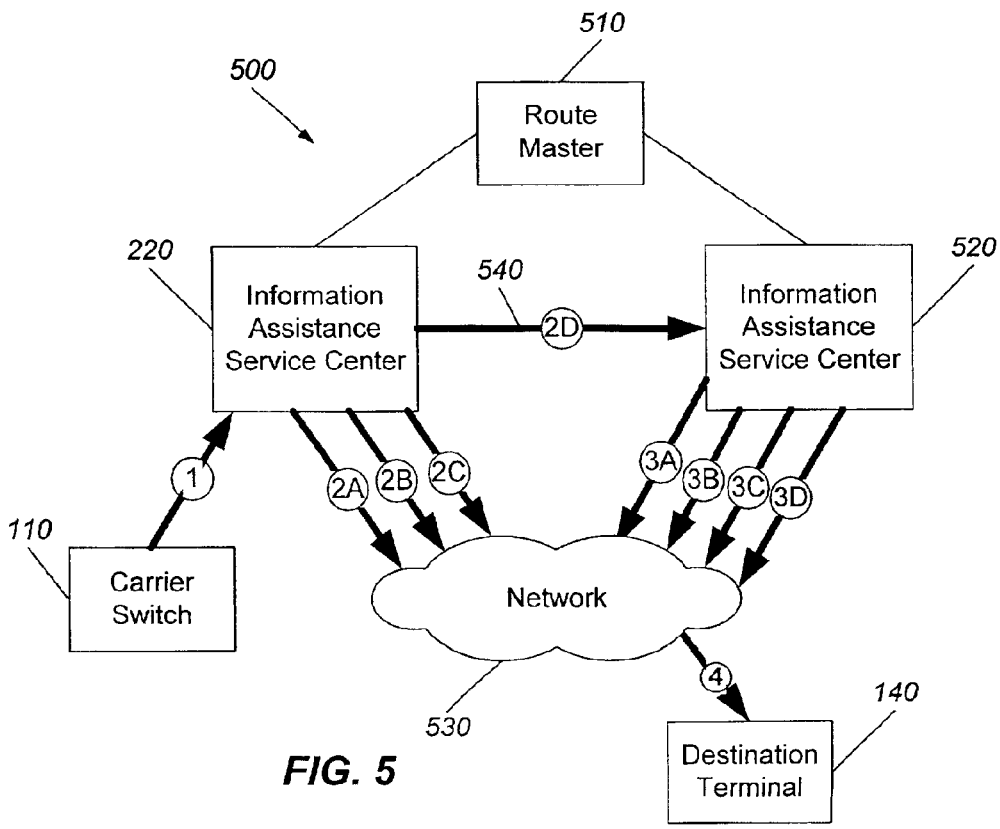
FIG. 5 illustrates a system, including an inter-machine transfer trunk, for connecting an information assistance service call to a destination terminal in accordance with a third embodiment of the present invention.

As mentioned above, other than EO, tandem, or IXC routing, a fourth method of routing, namely, an "inter-machine transfer" or "inter-machine trunk" (IMT) routing method, may be employed, which allows calls to be routed between information assistance service centers, thereby increasing the number of destinations served and the number of routes available for any particular destination. Referring to FIG. 5, in addition to carrier switch 110, information assistance service center 220, and destination terminal 140 that are included in FIG. 4, information assistance service system 500 also includes route master 510, information assistance service center 520 (similar to service center 220), network 530, and inter-machine trunk 540.

Information assistance service centers 220, 520 generally reside in different telephone markets (i.e., in different LATAs), although it is possible that they could reside within the same LATA. Inter-machine trunk 540 represents the switching connection between the information assistance service centers. Route master 510 is a routing database consulted by switch host computers in centers 220 and 520 to determine how a call should be terminated (i.e., through which switches and trunks the call should be routed to get to the destination terminal). The information assistance service centers have access to route master 510, preferably via a wide area network (WAN). Although it is possible for system 500 to contain only one route master 510, in order to provide redundancy for the database, more than one route master 510 will likely exist, with each route master containing the same information. Although not shown in FIG. 2, system 200 could also include a route master for determining how a call should be routed to its destination.

Furthermore, although only two information assistance service centers are shown in FIG. 5, many such centers can exist, and there will be at least one IMT 540 connected to each of the information assistance service centers. In such multi-center situations, IMTs can operate via a hub and spoke arrangement, a SONET ring, or other forms of interconnection.

As with network 130, network 530 represents a combination of public and private networks, switches, trunks, and central and end offices. However, because leg 2D connects to information assistance service center 520 in FIG. 5, network 530 is not exactly the same as network 130, which includes leg 2D and information assistance service center 520.

Routing using IMT 540 occurs as follows. Computer 320, with the ability to direct the call to destination terminal 140, accesses route master 510 and determines which switches and trunks must be routed through to get to destination terminal 140. If the most efficient routing to destination terminal 140 at that time is via legs 2A, 2B, or 2C (as in FIG. 4, e.g., via an EO, a tandem, an IXC, or other public or private switch or trunk), the call will be routed over one of those legs to network 530. If, however, the best routing to network 530 is via information assistance service center 520, then the call will be routed over leg 2D (i.e., IMT 540) to information assistance service center 520. From there, the call may be routed over legs 3A, 3B, or 3C in much the same manner as was done via legs 2A, 2B, and 2C in FIG. 4, and then over leg 4 to destination terminal 140. The call may also be routed over leg 3D via another IMT. Because there are likely more than just two information assistance service centers, there may be more than one possible route 2D to the destination.

In an embodiment of the invention, one routing may be initially preferred over another routing. Among the routing choices described above, a preferred routing hierarchy may include routing via an EO trunk, then, if it is not available, via a tandem trunk, then via an IMT trunk, then via an IXC trunk.

Several advantages of IMT routing can be appreciated. Routing over IMT 540 may be less expensive because IMT 540 may be proprietary to the information assistance service provider, and therefore use less of the public telephone network and other companies' facilities than without using the IMT. Routing over IMT 540 may also be quicker than alternative routes because there may be less traffic on IMT 540 than within the public telephone network. Finally, routing over IMT 540 may be more direct, especially if the destination is near the information assistance service center routing the call.

As mentioned previously, those skilled in the art will recognize that information assistance is not limited to directory assistance, but could also include providing information such as location and availability of restaurants, movie theater locations and movie times, travel directions, weather, traffic conditions, and other types of information. In addition, as a call router, the information assistance service center is able to route calls for these different types of information provided, e.g., to the restaurant to make reservations or to the movie box office to reserve tickets.

The present invention also includes using the information assistance service center to route calls serviced by an operator, such as collect calls, station-to-station calls, person-to-person calls, and calls billed to a third-party. As with directory assistance, operator-serviced calls routed to the information assistance service center from carrier switch 110 are routed to the network and the destination terminal without being routed back through the carrier switch.

In addition, the present invention includes using telecommunications relay stations to route calls. Such stations are used to assist hearing-impaired customers to use telecommunications services. These stations perform speech-to-text and text-to-speech conversion. In the context of the present invention, a carrier switch routes a call to the telecommunications relay station. Instead of the call being routed back through the carrier switch and then connected to the destination, the telecommunications relay station itself routes the call to the destination.

As discussed above, additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

For example, information assistance service center 220 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. A method for routing an information assistance service call, comprising:

receiving, by an information assistance service provider, a call via a servicing switch, the call being forwarded to the servicing switch by a carrier switch interfaced therewith, the information assistance service provider including a plurality of devices for answering the call;

switching, by the servicing switch, the call to a selected one of the devices in the information assistance service provider to answer the call, the call including an information assistance request;

providing an information assistance service in response to the request; and selecting, by the information assistance service provider, one or more switches in a carrier network to route the call therethrough to a destination terminal based on one or more criteria determined by the information assistance service provider, the one or more selected switches being different from the servicing switch and the carrier switch.

2. The method according to claim 1, further comprising searching a database for a telephone number associated with the destination terminal.

3. The method according to claim 2, wherein the database is accessed via an interface connected to the Internet.

4. The method according to claim 2, wherein the database includes restaurant listings.

5. The method according to claim 2, wherein the database includes movie listings.

6. The method according to claim 1, wherein the information assistance service is an operator-assisted service.

7. The method according to claim 6, wherein the operator-assisted service is selected from the group consisting of collect calling, station-to-station calling, person-to-person calling, and third-party-billed calling.

8. The method according to claim 1, wherein the information assistance service provider comprises a telecommunications relay station.

9. The method according to claim 1, wherein the call is routed through an end office trunk.

10. The method according to claim 1, wherein the call is routed through a tandem trunk.

11. The method according to claim 1, wherein the call is routed through a local exchange carrier.

12. The method according to claim 1, wherein the call is routed through an inter-exchange carrier.

13. The method according to claim 1, wherein the call is routed through an inter-machine transfer trunk.

14. The method according to claim 13, wherein the inter-machine transfer trunk connects two centers for providing information assistance service.

15. The method according to claim 1, wherein one of the criteria comprises the availability of routing trunks.

16. The method according to claim 1, wherein one of the criteria concerns the LATA within which the destination terminal resides.

17. The method according to claim 1, wherein one of the criteria concerns pricing.

18. The method according to claim 1, wherein one of the criteria comprises a preferred routing hierarchy.

19. A system for routing an information assistance service call, comprising:

a plurality of devices in an information assistance service provider for answering a call received via a servicing switch, the call being forwarded to the servicing switch by a carrier switch interfaced therewith, the servicing switch switching the call to a selected one of the devices in the information assistance service provider to answer the call, the call including an information assistance request;

an interface for providing an information assistance service in response to the request; and a control unit for selecting, by the information assistance service provider, one or more switches in a carrier network to route the call therethrough to a destination terminal, based on one or more criteria determined by the information assistance service provider, the one or more selected switches being different from the servicing switch and the carrier switch.

20. The system according to claim 19, wherein the interface includes a database for searching for a telephone number associated with the destination terminal.

21. The system according to claim 20, wherein the interface is connected to the Internet.

22. The system according to claim 20, wherein the database includes restaurant listings.

23. The system according to claim 20, wherein the database includes movie listings.

24. The system according to claim 19, wherein the interface includes an operator.

25. The system according to claim 19, wherein the information assistance service is an operator-assisted service.

26. The system according to claim 25, wherein the operator-assisted service is selected from the group consisting of collect calling, station-to-station calling, person-to-person calling, and third-party-billed calling.

27. The system according to claim 19, wherein the information assistance service provider comprises a telecommunications relay station.

28. The system according to claim 19, wherein the control unit consults a routing database to determine an available connection.

29. The system according to claim 19, wherein the call is routed through an end office trunk.

30. The system according to claim 19, wherein the call is routed through a tandem trunk.

31. The system according to claim 19, wherein the call is routed through a local exchange carrier.

32. The system according to claim 19, wherein the call is routed through an inter-exchange carrier.

33. The system according to claim 19, wherein the call is routed through an inter-machine transfer trunk.

34. The system according to claim 33, wherein the inter-machine transfer trunk connects to a center for providing an information assistance service.

35. The system according to claim 19, wherein one of the criteria comprises the availability of routing trunks.

36. The system according to claim 19, wherein one of the criteria concerns the LATA within which the destination terminal resides.

37. The system according to claim 19, wherein one of the criteria concerns pricing.

38. The system according to claim 19, wherein one of the criteria comprises a preferred routing hierarchy.

39. A system for routing an information assistance service call, comprising:

a first center for providing an information assistance service;

a second center for providing an information assistance service; and a transfer trunk connecting the first and second centers, wherein the first information assistance service center receives the call from a caller via a carrier switch, provides an information assistance service to the caller, and, without routing the call back through the carrier switch, selects based on one or more criteria the transfer trunk over which the call is routed to a destination terminal connected to a carrier network.

40. The system according to claim 39, further comprising a database for searching for a telephone number associated with the destination terminal.

41. The system according to claim 40, wherein the database is accessed via an interface connected to the Internet.

42. The system according to claim 40, wherein the database includes restaurant listings.

43. The system according to claim 40, wherein the database includes movie listings.

44. The system according to claim 39, wherein the information assistance service is an operator-assisted service.

45. The system according to claim 44, wherein the operator-assisted service is selected from the group consisting of collect calling, station-to-station calling, person-to-person calling, and third-party-billed calling.

46. The system according to claim 39, wherein the information assistance service comprises a telecommunications relay station.

47. The system according to claim 39, further comprising a routing database for determining how to route the call to the destination terminal.

* * * * *